G. P. MEYERS.
RIM CONTRACTOR.
APPLICATION FILED NOV. 6, 1913.
1,108,774.
Patented Aug. 25, 1914.
2 SHEETS—SHEET 1.
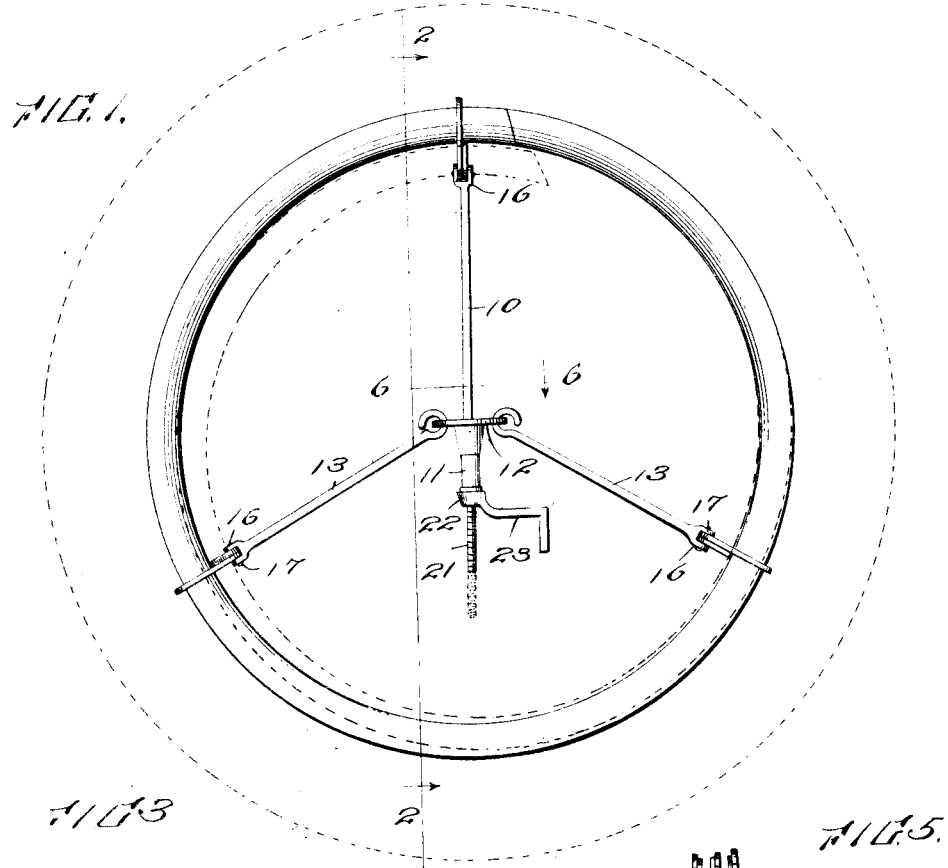
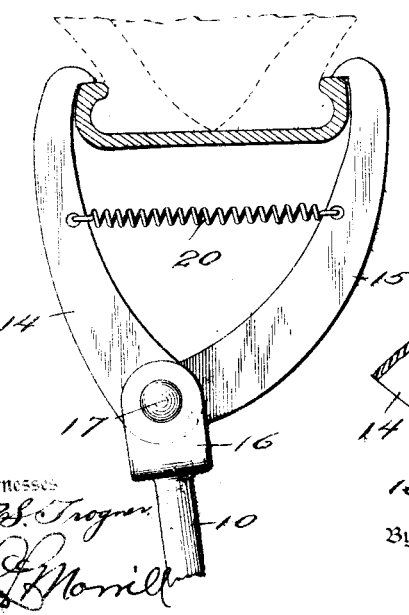
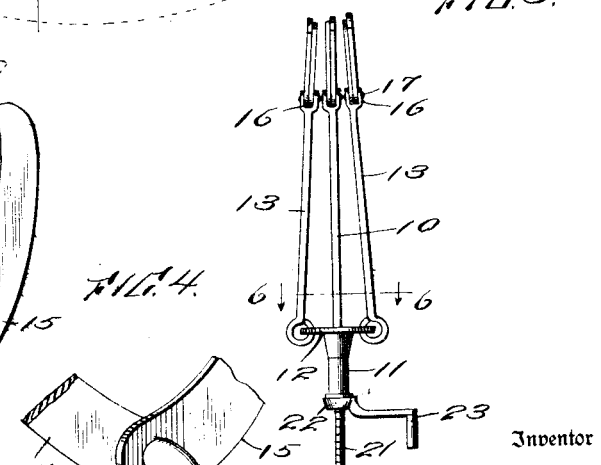

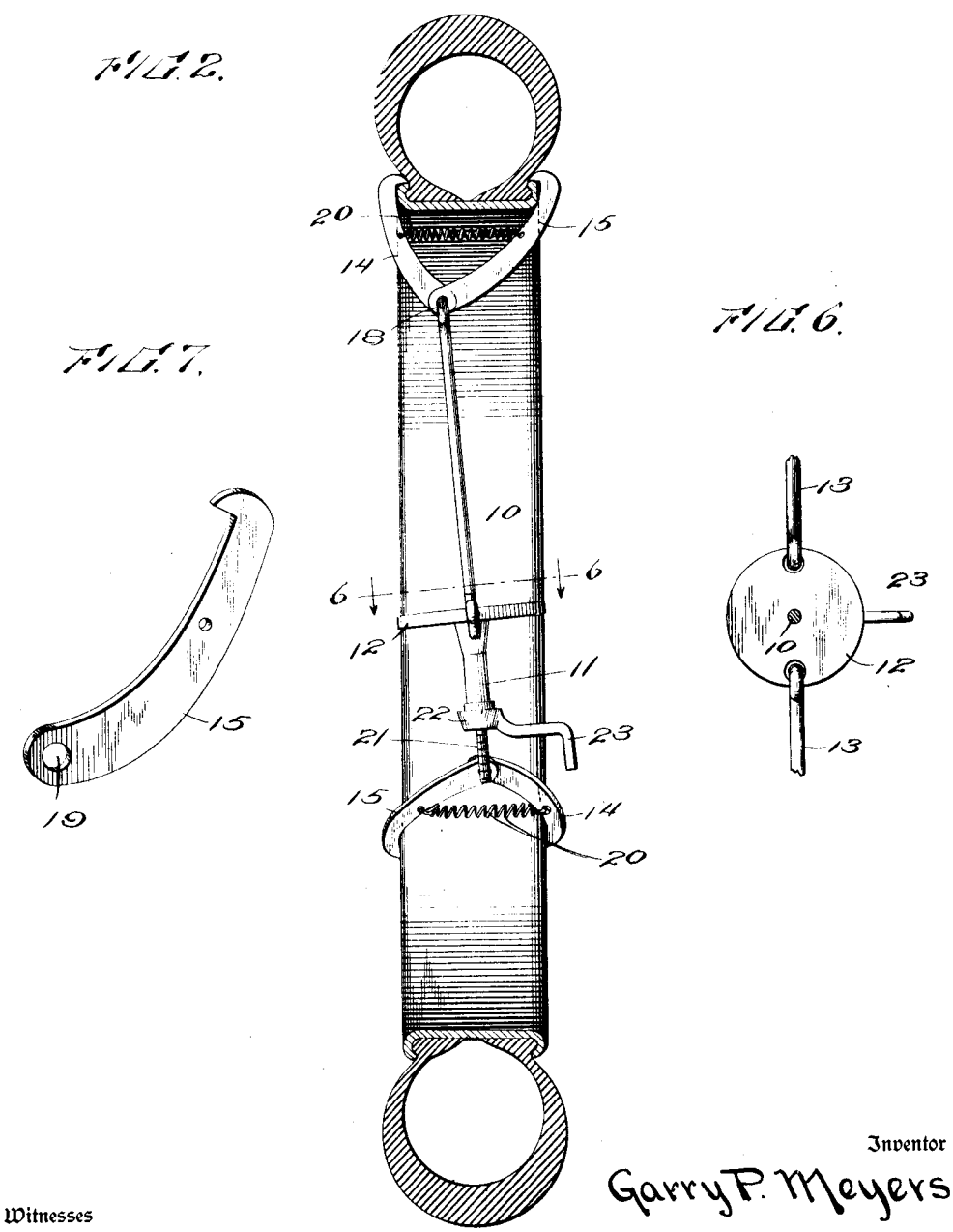

UNITED STATES PATENT OFFICE.

GARRY P. MEYERS, OF MOUNTAIN VIEW, MISSOURI.

RIM-CONTRACTOR.

1,108,774.  Specification of Letters Patent.  Patented Aug. 25, 1914.

Application filed November 6, 1913. Serial No. 799,606.

*To all whom it may concern:*

Be it known that I, GARRY P. MEYERS, a citizen of the United States, residing at Mountain View, in the county of Howell and State of Missouri, have invented certain new and useful Improvements in Rim-Contractors; and I do hereby declare the following to be a full, clear, and exact description of the invention, such as will enable others skilled in the art to which it appertains to make and use the same.

This invention relates to rim contractors and has for an object to provide a device for contracting the demountable wheel rim of an automobile or the like to permit the removal of the shoe therefrom.

A further object of the invention is to provide a mechanical structure which will operate with demountable rims of the usual and ordinary type as for instance clencher rims whereby one of the abutting ends of such rim is drawn inwardly toward the center to contract the rim and simultaneously to twist the structure of such rim to draw the abutting ends apart which are abutting upon an angle other than a radius.

A further object of the invention is to provide a gripper claw to be used at the end of the movable parts for engaging and retaining its contact with the inturned flanged edges of the rim.

With these and other objects in view the invention comprises certain novel constructions, combinations and arrangement of parts as will be hereinafter more fully described and claimed.

In the drawings: Figure 1 is a view of the improved rim contractor in position upon a rim and showing in dotted lines the rim drawn inwardly so that the shoe may be removed. Fig. 2 is a transverse sectional view approximately on a diameter as indicated by line 2—2 of Fig. 1. Fig. 3 is a detail view of one of the gripper claws with one form of connection with the moving parts. Fig. 4 is a fragmentary view showing another form of hinging the gripper claws to the moving parts. Fig. 5 is a view of the device folded for storage or transportation. Fig. 6 is a sectional view taken on line 6—6 of Figs. 1, 2 and 5. Fig. 7 is a perspective view of one of the gripper claws.

Like characters of reference designate corresponding parts throughout the several views.

The improved rim contractor which forms the subject matter of this application comprises a rod 10 upon which slides a sleeve 11, said sleeve being preferably provided with a head or flange 12 by which links or other rods 13 are pivotally connected to such sleeve 11. Each of the rods 10 and 13 carries gripper claws consisting of a short claw 14 and a long claw 15 pivoted to the rods in any approved manner. As shown at Figs. 1, 3 and 5 the pivoting is accomplished by forming ears 16 upon such rods with the claws pivoted between such ears by means of rivets 17.

As shown at Figs. 2 and 4 the claws are pivoted to the rods by forming eyes 18 in the rods themselves extending through openings 19 in the claws, one such opening being shown at Fig. 7. The latter manner of pivoting has the advantage of cheapness and economy and further has the advantage that the claws may be folded backwardly adjacent the rods when desired. Between the gripper claw springs 20 are employed which tend to move such claws yieldingly together to grip yieldingly over the edges of the clencher rim as shown particularly at Figs. 2 and 3. The rod 10 is screw threaded at the end opposite its claws as shown at 21 and a nut 22 is mounted upon such threaded portion carrying a preferably integral crank 23 by which said nut may be manipulated.

In contracting a rim it is found that it adds to the facility of the work if the rim is given a twisting motion at the time one of the ends is drawn inwardly. For this reason the device is provided with long and short claws with the short claw of the rod 10 engaging one edge of the rim while the short claw of each link or rod 13 engages the opposite edge of the rim so that the structure extends through the wheel staggered relative to a central plane as indicated at Fig. 2. The engaging of the short claws upon the opposite edges of the rim as indicated at Fig. 2 will of necessity cause the long claws also to engage opposite edges as likewise indicated. The relation of the long and short claws is such that the principal pull caused by manipulating the nut 22 will be exerted upon the short claw, the long claws being employed principally to hold the short claw from slipping from its engagement upon the edge of the rim. The springs 20 perform the function of drawing the claws together when the device is placed upon the rim but as soon as stress is exerted upon the nut 22 the stress serves to grip the claws tighter and the spring performs but little if any function after such stress is applied.

With the device disposed upon the rim as shown at Figs. 1 and 2 it will be apparent that the manipulation of the nut 22 will serve to first draw the upper left-hand edge of the rim as shown at Figure 2 thereby exerting a twisting action to disengage the extremities of the rim, the claws of the rod 10 being engaged adjacent one of the ends as shown particularly at Fig. 1.

The rim being contracted to dotted line position as shown at Fig. 1 it will be apparent that the shoe may be readily disengaged therefrom and slipped off from the rim. The rim is preferably retained in such contracted condition until a new shoe has been slipped into place whereupon the action of the nut 22 is reversed and the rim allowed to return to full line position.

I claim:

1. In a rim contractor, a rod having a pair of gripper claws at one end and screw-threaded at the opposite end; a sleeve slidable upon the screw-threaded portion of the rod, links each pivoted at one end to the sleeve and having a pair of gripper claws at its other end, one claw being long and the other short, and a nut upon the screw-threaded portion of the rod adapted to move the sleeve slidably upon such rod.

2. In a rim contractor, a plurality of rods, each provided with a pair of gripper claws at its outer end, a spring connecting the members of each pair, said rods adapted to extend substantially radially from a common center; and means to draw one of said rods toward the center upon such radius.

3. In a rim contractor, a plurality of rods radiating from a central point; gripper claws carried at the ends of each of said rods, said gripper claws being composed respectively of one long and one short claw; and means to draw one of said rods through the center upon its radius.

4. In a rim contractor, a plurality of grippers composed respectively of pairs of pivoted long and short claws; means connecting said grippers to a central point; and means to draw one of said grippers toward the center.

5. The combination with a rim, of a contractor embodying a plurality of grippers, each consisting of a pivoted long and short claw, the short claw of one gripper adapted to engage one edge of the rim and the short claw of another gripper adapted to engage the opposite edge of the rim; and means to draw said grippers toward each other on a line at an angle to the main plane of the rim.

In testimony whereof I affix my signature in the presence of two witnesses.

GARRY P. MEYERS.

Witnesses:
RAY L. GROSVENOR,
CHARLES M. MATHEWS.